June 15, 1954
E. A. HARWOOD
2,681,199
GLARE SHIELD FOR VEHICLES
Filed June 16, 1952
2 Sheets-Sheet 1
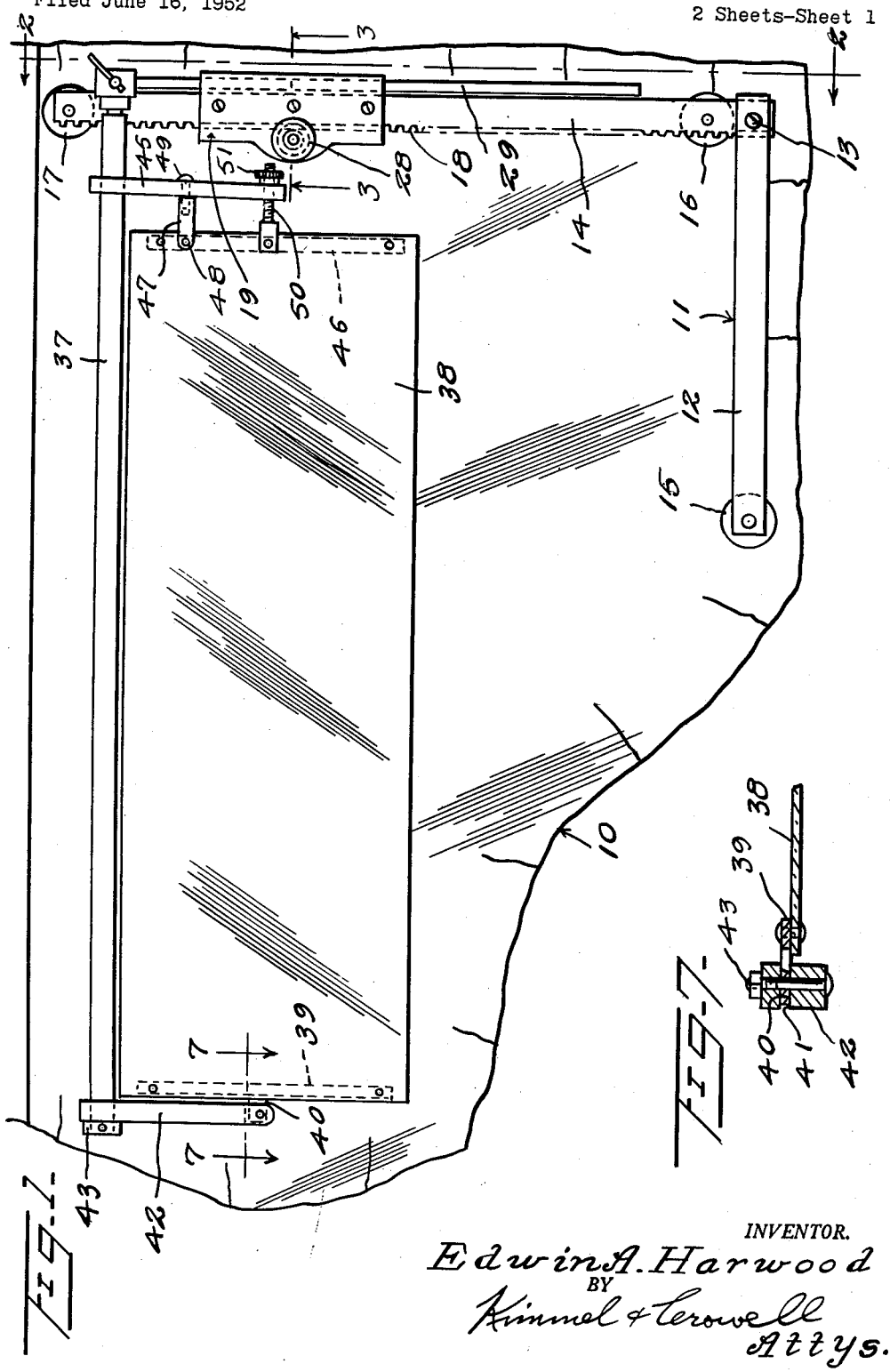
INVENTOR.
Edwin A. Harwood
BY
Kimmel & Crowell
Attys.

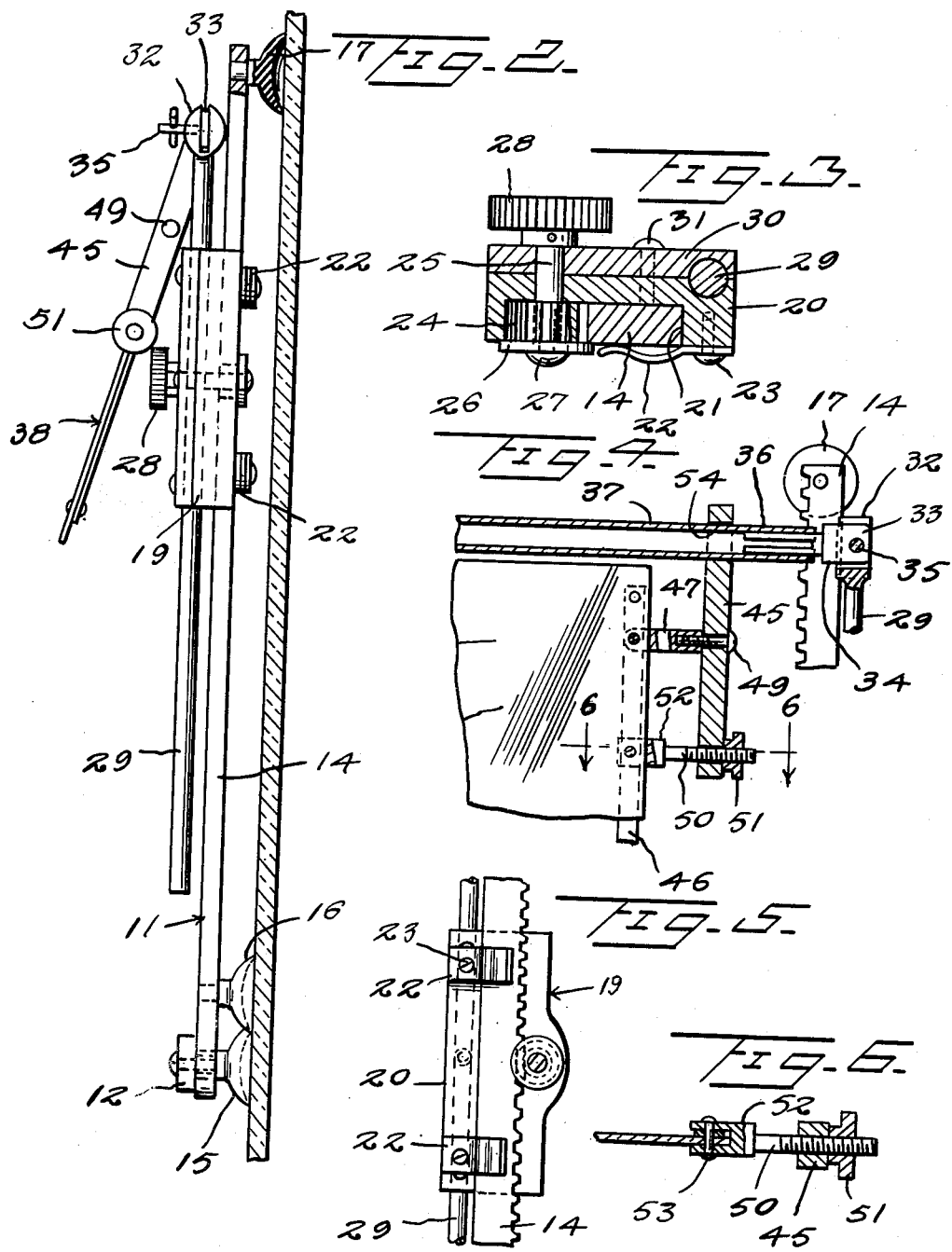

Patented June 15, 1954

2,681,199

UNITED STATES PATENT OFFICE 2,681,199

GLARE SHIELD FOR VEHICLES

Edwin A. Harwood, Oshkosh, Wis.

Application June 16, 1952, Serial No. 293,743

2 Claims. (Cl. 248—206)

This invention relates to a glare shield for vehicles.

An object of this invention is to provide a glare shield for vehicles which is adapted to be mounted on the inside of the windshield so as to eliminate glare from bright headlights.

Another object of this invention is to provide a glare shield which includes a supporting means adapted to be fixed to the inside of the windshield by means of suction cups, and which also includes a glare shield element with means for adjusting the element perpendicularly and angularly.

A further object of this invention is to provide in a mounting means for a glare shield means whereby the shield may be initially quickly adjusted to an approximate position and then finely adjusted to the correct position.

With the above and other objects in view, my invention consists in the arrangement, combination and details of construction disclosed in the drawings and specification, and then more particularly pointed out in the appended claims.

In the drawings:

Figure 1 is a detailed front elevation of a glare windshield device constructed according to an embodiment of this invention showing the device in applied position on the inner side of the windshield.

Figure 2 is a sectional view taken on the line 2—2 of Figure 1.

Figure 3 is a fragmentary sectional view taken on the line 3—3 of Figure 1.

Figure 4 is a fragmentary front elevation partly in section of the device.

Figure 5 is a fragmentary rear elevation of a portion of the device.

Figure 6 is a fragmentary sectional view taken on the line 6—6 of Figure 4.

Figure 7 is a fragmentary sectional view taken on the line 7—7 of Figure 1.

Referring to the drawings, numeral 10 designates generally a windshield of conventional construction and the numeral 11 designates generally a frame structure which is mounted on the inner side of the windshield 10. The frame 11 is formed of a lower substantially horizontal bar 12 with an elongated rack bar 14 secured at one end thereof to bar 12 by means of a fastening member 13. The bar 12 has projecting from one side thereof a rubber suction cup 15 which is adapted to engage the inner side of the windshield 10, and rack bar 14 has secured thereto a pair of suction cups 16 and 17.

The two bars 12 and 14 are shown as being disposed at substantially right angles relative to each other, but it will be understood that these bars may be disposed at any desired angular relation one with respect to the other. Rack bar 14 will be normally disposed in a perpendicular position and the teeth 18 of bar 14 are disposed on the inner side thereof.

A slide member generally designated as 19 slidably engages the rack bar 14 and is formed of a body 20 having a channel 21 opening through one side thereof, within which the bar 14 slidably engages. Slide 19 is resiliently and frictionally held against movement on the bar 14 by means of a pair of spring clips 22 which are secured by fastening means 23 to the slide 20 and engaged over the outer side of bar 14, as shown in Figure 3.

A spur gear 24 is mounted on a shaft 25 rotatably carried by the slide 20 and gear 24 meshes with gear teeth 18. One end of shaft 25 has a collar 26 mounted thereon which engages the adjacent or rear side of slide 20 and a fastening member 27 holds the washer 26 on shaft 25 and rotatably bears against the adjacent rear side of slide 20. A knob or operator 28 is secured to the opposite end of shaft 25 on the forward side of slide 20 so that gear 24 may be manually rotated to move slide 19 perpendicularly with respect to rack bar 14. An elongated rod 29 is adjustably carried by slide 20 and, as shown in Figure 3, slide 20 includes a plate 30 secured to the forward side thereof by fastening members 31. Plate 30 frictionally bears against rod 29 so as to frictionally hold rod 29 against perpendicular or endwise movement.

The upper end of rod 29 is formed with a bifurcated head 32 within which the flattened end 33 of a stud 34 engages. A bolt 35 is threaded transversely across the head 32 extending through the flattened or reduced end 33 of stud 34 so as to hold stud 34 against rocking movement relative to head 32. Stud 34 includes a split shank 36 which is extended into one end of an elongated tubular shield supporting member 37. A glare shield member 38 is disposed below the supporting member 37, and the outer end of shield member 38 has fixed thereto a bar 39, formed with an outwardly extending lug 40, which engages in a slot 41 formed in a supporting bar 42, which depends from the outer end of supporting member 37. The bar 42 loosely engages about supporting member 37, and a collar 43 is fixed on tubular member 37 for holding bar 42 against endwise movement in one direction. Lug 40 is secured to bar 42 by means of a bolt 43. A second shield supporting bar 45 is loosely mounted at its upper end on supporting member 37, and the inner end of shield member 38 has secured thereto a reinforcing bar 46. A lug 47 is secured by fastening means 48 to the inner end of shield member 38 and bar 46 and a bolt or screw 49 extends loosely through bar 45 and is threaded into lug 47. Lug 47 constitutes a fulcrum member, the purpose for which will be hereinafter described.

Shield locking bolt 50 extends loosely through the lower end of supporting member 45 and has a nut 51 threaded thereon bearing against the inner side of bar 45. The bolt 50 is formed with a bifurcated end 52 engaging about the shield 38 and the reinforcing bar 47, and a fastening member 53 secures the bifurcated head 52 to shield 38. Adjustment of nut 51 toward the inner end of shield 38 will rock bar 45 on fulcrum member or lug 47 and thereby effect a binding action of the upper end of bar 45 on tubular member 37. This binding action takes place at each end of the opening 54, which is formed through the upper end of bar 45.

In the use and operation of this device, the frame 11 is secured by the suction cups 15, 16, and 17 to the inner side of the windshield 10 with rack bar 14 disposed substantially centrally of the width of the windshield 10. Bar 14 will be disposed in substantially a vertical position, and shield supporting member 37 will be disposed in a substantially horizontal position. When it is desired to adjust the vertical position of glare shield 38, rod 29 may be moved upwardly or downwardly by either grasping rod 29 or grasping supporting member 37. This initial adjustment may be accomplished without movement of slide member 19, as this slide member is resiliently held against movement by the spring clips 22. After the initial rough adjustment is made of shield 38, a close or fine adjustment may be made by rotating hand wheel or knob 28 so as to move slide 19 up or down on rack bar 14. Shield member 38 may be angularly adjusted with respect to the windshield by loosening nut 51 and swinging supporting bars 42 and 45 on the horizontal supporting bar 37. When the angular position of glare shield 38 is obtained, the glare shield may be locked at its angular adjusted position by tightening nut 51 against the lower end of locking bar 45 so as to rock bar 45 on fulcrum lug 47.

What is claimed is:

1. A glare shield for mounting on the inside of a windshield comprising an L-shaped frame formed of a horizontal lower side and a vertical inner side, said inner side having gear teeth along one edge thereof, a slide carried by said vertical side, a gear rotatably carried by said slide meshing with said gear teeth on said vertical side, a knob fixed relative to said gear, a substantially rectangular glare shield, a supporting member secured to said shield, said member including a horizontal bar and a depending bar, means frictionally securing said depending bar to said slide whereby said bar may be frictionally adjusted relative to said slide, and suction cups carried by said frame for securing said frame to said windshield.

2. A glare shield for mounting on the inside of a windshield comprising an L-shaped frame formed of a horizontal lower side and a vertical inner side, said inner side having gear teeth along one edge thereof, a slide carried by said vertical side, a gear rotatably carried by said slide meshing with said gear teeth on said vertical side, a knob fixed relative to said gear, a substantially rectangular glare shield, a horizontal supporting bar, means securing said shield to said supporting bar, a depending bar at one end of said supporting bar, means frictionally securing said depending bar to said slide whereby said depending bar may be adjusted relative to said slide, resilient means carried by said slide engaging said vertical inner side of said frame for holding said slide against movement when said depending bar is adjusted relative to said slide, and suction cups carried by said frame for attaching the latter to the windshield.

References Cited in the file of this patent

UNITED STATES PATENTS

| Number | Name | Date |
|---|---|---|
| 1,494,033 | Stevens | May 13, 1924 |
| 1,931,438 | Hitz | Oct. 17, 1933 |
| 1,941,032 | Knowles | Dec. 26, 1933 |
| 2,286,935 | Schendler | June 16, 1942 |

FOREIGN PATENTS

| Number | Country | Date |
|---|---|---|
| 46,245 | Norway | Mar. 11, 1929 |
| 324,733 | Great Britain | Feb. 6, 1930 |
| 811,654 | Germany | Aug. 23, 1951 |